United States Patent
Tanaka et al.

(10) Patent No.: US 6,712,232 B2
(45) Date of Patent: Mar. 30, 2004

(54) PLASTIC CONTAINER AND METHOD OF MANUFACTURING THE SAME

(75) Inventors: Yoji Tanaka, Kawasaki (JP); Toru Ichikawa, Misato (JP); Tomio Tahara, Tokyo-To (JP)

(73) Assignees: Kabushiki Kaisha Hosokawa Yoko, Tokyo-to (JP); Kamaya Kagaku Kyogo Kabushiki Kaisha, Tokyo-to (JP)

( * ) Notice: Subject to any disclaimer, the term of this patent is extended or adjusted under 35 U.S.C. 154(b) by 0 days.

(21) Appl. No.: 09/821,074

(22) Filed: Mar. 30, 2001

(65) Prior Publication Data

US 2001/0026872 A1 Oct. 4, 2001

(30) Foreign Application Priority Data

Mar. 30, 2000 (JP) .......................................... 2000-094352

(51) Int. Cl.[7] .............................................. B65D 90/02
(52) U.S. Cl. ...................................... 215/379; 220/660
(58) Field of Search ................................ 215/379, 380, 215/386, 395, 370, 12.1, 372; 220/660, 662, 665, 678, 694, 737, 740, 600, 605, 616, 611, 613, 635; 222/573

(56) References Cited

U.S. PATENT DOCUMENTS

| 2,802,593 A | * | 8/1957 | Slaughter | ...................... 156/69 |
|---|---|---|---|---|
| 2,849,144 A | | 8/1958 | Southwell | |
| 3,356,263 A | * | 12/1967 | Monroe | ....................... 222/107 |
| 3,432,072 A | * | 3/1969 | Quercia | ....................... 220/613 |
| 3,567,104 A | | 3/1971 | Arslanian et al. | |
| 3,734,393 A | * | 5/1973 | Stump | ......................... 222/573 |
| 5,058,801 A | * | 10/1991 | Frey et al. | .................... 220/601 |
| 5,465,856 A | * | 11/1995 | Sheffler | ....................... 215/370 |
| 5,921,431 A | * | 7/1999 | Pych | ........................... 215/10 |
| 6,068,900 A | * | 5/2000 | Kohn et al. | ................. 215/12.2 |
| 6,334,548 B1 | * | 1/2002 | Ichikawa et al. | ........... 222/107 |

FOREIGN PATENT DOCUMENTS

| CH | 537 299 | | 5/1973 | |
|---|---|---|---|---|
| EP | 0 893 355 A2 | | 1/1999 | |
| GB | 2 132 978 A | | 7/1984 | |
| GB | 2132978 | * | 7/1984 | .................. 215/379 |

* cited by examiner

*Primary Examiner*—Lee Young
*Assistant Examiner*—Lien Ngo
(74) *Attorney, Agent, or Firm*—Birch, Stewart, Kolasch & Birch, LLP

(57) ABSTRACT

A plastic container contains a liquid, such as toilet water or soy source, and is suitable for containing a refill. The plastic container (1) has a tube (2) formed by rolling a plastic laminate in a tubular shape, a bottom wall (3) formed so as to be joined to the inner circumference of a lower end part of the tube (2) by an insert injection molding process, a hoop (4) formed on the outer circumference of an upper end part of the tube (2) by an insert injection molding process and a top cover (6) provided with a spout (5) and bonded to the upper end surface of the hoop (4).

6 Claims, 6 Drawing Sheets

PLASTIC CONTAINER AND METHOD OF MANUFACTURING THE SAME

BACKGROUND OF THE INVENTION

1. Field of the Invention

The present invention relates to a plastic container for containing a liquid, such as toilet water or soy source and, more particularly, to a plastic container for containing a refill and a method of manufacturing such a plastic container for containing a refill.

2. Description of the Related Art

A known cartridge, i.e., a plastic container, capable of sealing a fluidic material, such as an adhesive, therein is formed by insert injection molding using a mold.

FIG. 5 shows a known cartridge 101 formed by insert injection molding using a mold. The cartridge 101 has a tube 102 of a plastic laminate, a bottom molded part 103 joined to a lower end part of the tube 102, a top molded part 104 joined to an upper end part of the tube 102, and a bottom member 106 of a plastic laminate bonded to the lower end of the bottom molded part 103. When forming the cartridge 101 by insert injection molding, a mold inserted in the tube 102 must be capable of being extracted from the tube 102. Therefore the inner circumference of the tube 102 must be smooth and must not have irregularities and the tube 102 must be slightly tapered from its lower end on the side of the bottom molded part 103 toward its upper end on the side of the top molded part 104.

FIG. 6 is a sectional view of assistance in explaining a method of manufacturing the known cartridge 101. The tube 102 has the shape of a tube having opposite open ends. The tube 102 is put on a mandrel 100, i.e., a metal core, tapered from its lower end toward its upper end. When the mandrel 100 holding the tube 102 is set in a mold 111, a molding cavity 103a corresponding to the annular bottom molded part 103 of the cartridge 101 is formed around the lower end part of the tube 102, and a molding cavity 104a corresponding to the top molded part 104 is formed around the upper end part of the tube 102. The molding cavities 103a and 104a are connected to a runner 112 formed in the mold 111. After the tube 102 has been thus set in the mold 111, a molten synthetic resin, such as a molten polyethylene resin through a gate 113 formed in the mold 111 and the runner 112 into the molding cavities 103a and 104a by an insert injection molding means. Thus, a body having the tube 102 provided with an annular bottom molded part 103 on its lower end part and a top molded part 104 joined to the upper end of the tube 102, and having an open bottom end is formed.

Since the cartridge 101 is formed by insert injection molding using the mold, the bottom molded part 103 must be formed in an annular shape on the lower end part of the tube 102 when the top molded part 104 having an outlet opening is joined to the upper end of part of the tube 102. Since the bottom molded part 103 is open, the bottom member 106 of the plastic laminate similar to that forming the tube 102 must be joined to the lower end of the bottom molded part 103 by heat sealing.

Since the bottom member 106 of the plastic laminate is joined to the bottom molded part 103 of the cartridge 101, gaps are liable to be formed in the joint 106a of the bottom molded part 103 and the bottom member 106 if the rigidity of the bottom molded part 103 is insufficient and the bottom molded part 103 is loaded during transportation, and the cartridge 101 falls down easily. If the bottom member 106 of the plastic laminate is bonded unsatisfactorily to the bottom molded part 103, the contents of the cartridge 101 leaks through faultily bonded parts of the joint of the bottom member 106 and the bottom molded part 103. Even if the bottom member 106 is bonded closely to the bottom molded part 103, the bottom member 106 of the plastic laminate is broken with a sharp point and the contents leaks or the barrier property of the bottom member 106 is deteriorated.

SUMMARY OF THE INVENTION

The present invention has been made in view of the foregoing problems and it is therefore an object of the present invention to provide a plastic container having a rigid bottom wall formed by molding a plastic material and resistant to the accidental formation of holes therein and the resultant leakage of the contents of the plastic container.

A plastic container according to one aspect of the present invention comprises a tube of a plastic laminate, a bottom wall formed so as to be joined to the inner circumference of a lower end part of the tube by an insert injection molding process, a hoop formed on the outer circumference of an upper end part of the tube by an insert injection molding process, and a top cover provided with a spout and bonded to the upper end surface of the hoop.

Since the bottom wall is joined to the inner circumference of the lower end part of the tube and the hoop is joined to the outer circumference of the upper end part of the tube, a mandrel inserted in the tube for insert injection molding can be extracted from the tube. Thus, the bottom wall and the hoop of the plastic container can be formed integrally with the tube by the insert injection molding process to complete the plastic container. The bottom wall thus formed by the insert injection molding process is more resistant to breakage than the bottom wall of the plastic laminate.

In this invention, the term of "insert injection molding means" is used in the sense that the plastic container is manufactured in the steps of:

forming the tube; putting the tube on a mandrel; inserting the mandrel holding the tube in a mold; injecting a molten resin into the first and the second cavity to form the bottom wall and the hoop; and bonding the top cover.

BRIEF DESCRIPTION OF THE DRAWINGS

The above and other objects, features and advantages of the present invention will become more apparent form the following description taken in connection with the accompanying drawings, in which.

DESCRIPTION OF THE PREFERRED EMBODIMENTS

Figure 1:
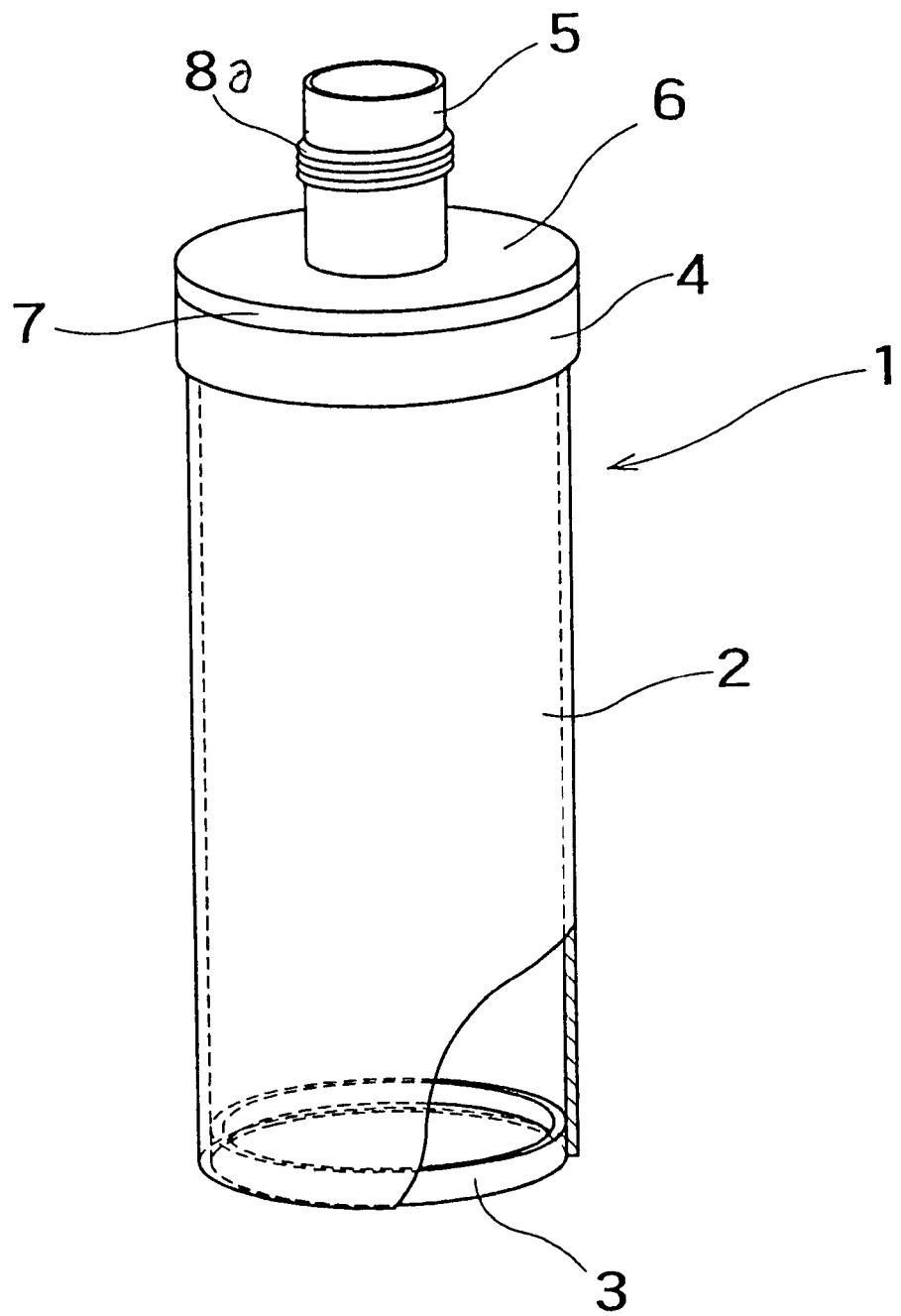
FIG. 1 is a perspective view of a plastic container in a preferred embodiment according to the present invention.
Figure 3A:
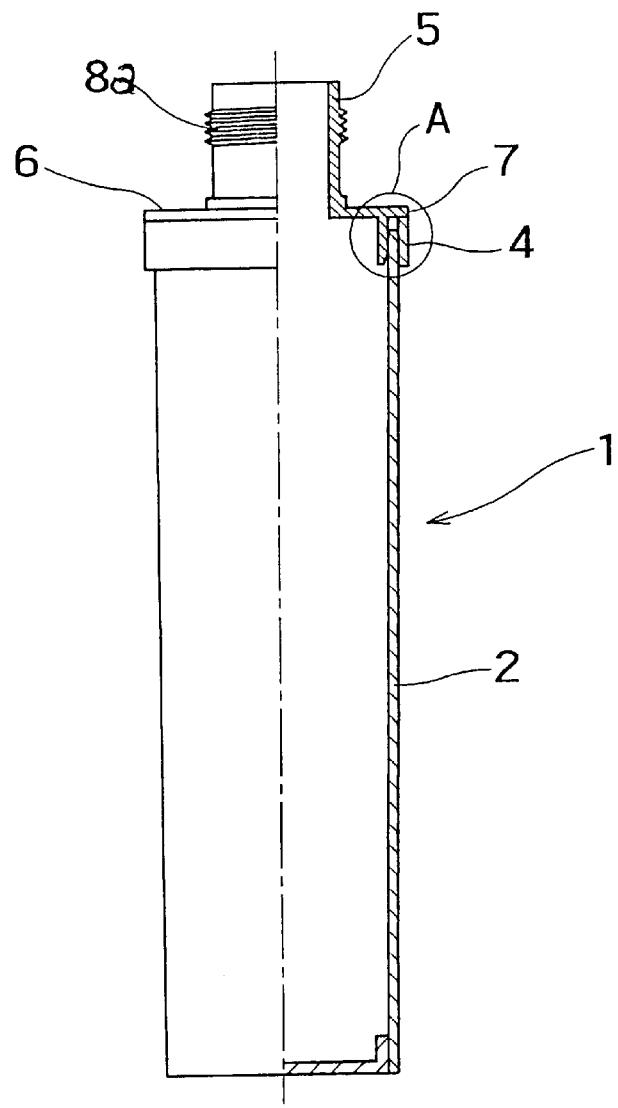
FIG. 3(a) is a half sectional view of the plastic container shown in FIG. 1.
Figure 3B:
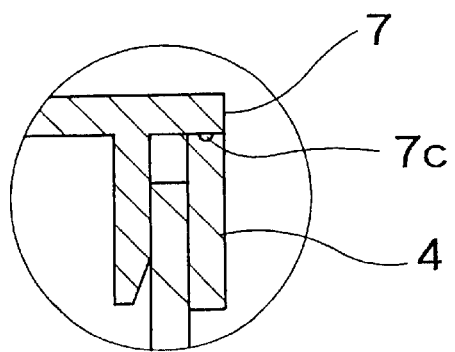
FIG. 3(b) is an enlarged part of A shown in FIG. 3(a).

Referring to FIGS. 1 and 3, a plastic container 1 in a preferred embodiment according to the present invention has a tube 2 formed from a plastic laminate, a bottom wall 3 formed so as to be joined integrally to the inner circumference of a lower end part of the tube 2 by an insert injection molding process, a hoop 4 formed so as to be joined integrally to the outer circumference of an upper end part of the tube 2, and a top cover 6 provided with a spout 5 and bonded to the upper end surface of the hoop 4.

The tube 2 is a tubular member having opposite open ends formed by rolling a rectangular plastic laminate in a tubular shape and bonding together the opposite side parts of the rectangular plastic laminate in a lap joint. The tube 2 may be formed by bonding together the opposite side edges of the rectangular plastic laminate in a butt joint.

The plastic laminate is, for example, a flexible, opaque laminated film formed by laminating a 30 to 60 $\mu$m thick polyethylene film, a 12 $\mu$m thick polyester film, a 9 $\mu$m thick aluminum foil and a 30 to 60 $\mu$m thick polyethylene film. The plastic laminate may be a transparent laminated film formed by laminating a 30 to 60 $\mu$m thick cast polypropylene film, a 12 $\mu$m silica-coated film and a 30 to 60 $\mu$m thick cast polypropylene film.

As shown in FIG. 1, the top cover 6 has a circular flange 7 having an outline coinciding with that of the hoop 4. The spout 5 projects from a central part of the flange 7. A screw thread 8 is formed on the outer circumference of the spout 5 to screw a cap on the spout 5. Projections are formed at angular intervals on a part of the lower surface of the flange 7 corresponding to the upper end surface of the hoop 4. The projections have a cross section of a shape substantially resembling a regular triangle, a width in the range of 0.5 to 0.7 mm and a height in the range of 0.5 to 0.7 mm.

Figure 2:
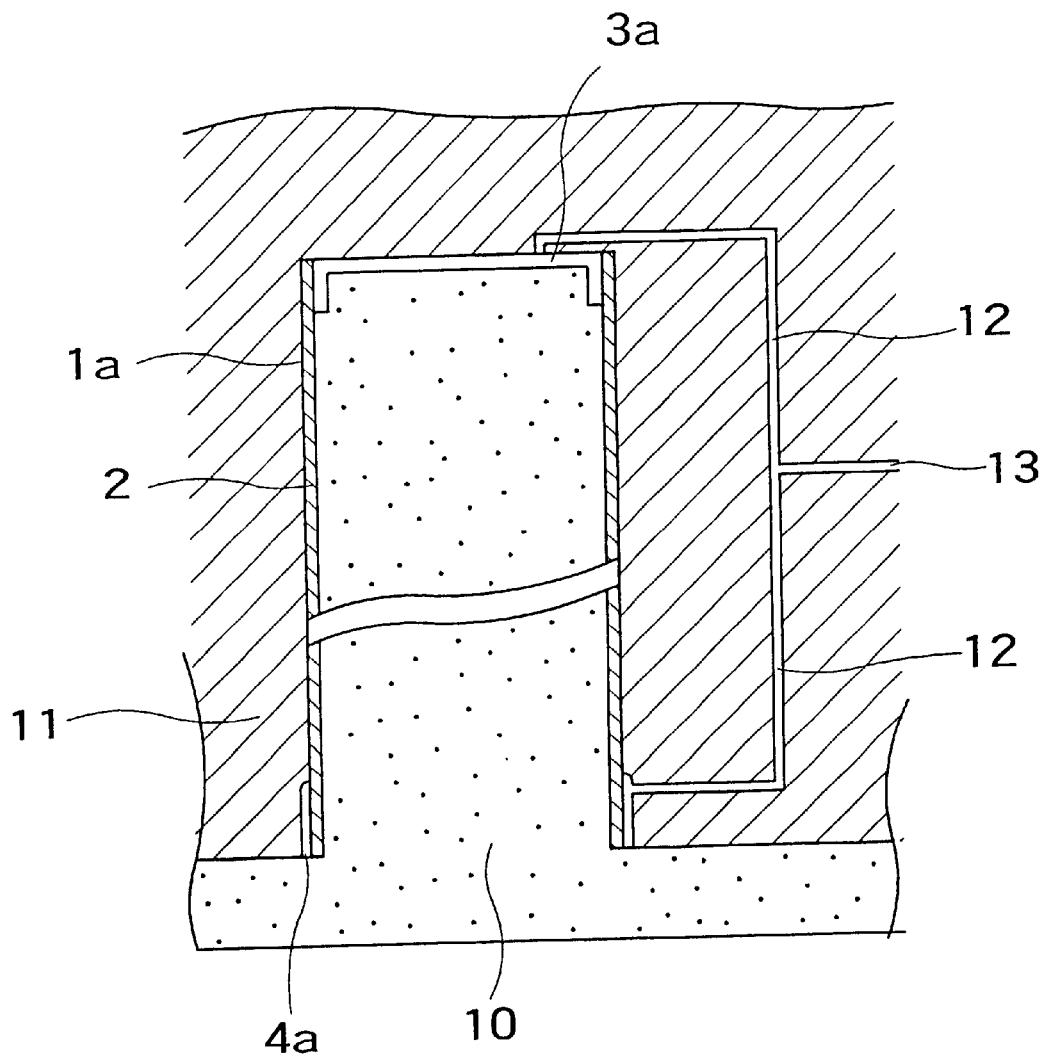
FIG. 2 is a sectional view of assistance in explaining a method of manufacturing the plastic container shown in FIG. 1.

Referring to FIG. 2, the tube 2 having opposite open ends is mounted on a tapered mandrel 10 serving as a core. When the mandrel 10 holding the tube 2 is placed in a mold 11, a molding cavity 3a for molding the bottom wall 3 of the plastic container 1 is formed inside one end part of the tube 2 and a molding cavity 4a for molding the hoop 4 is formed around the other end part of the tube 2. The molding cavities 3a and 4a are connected to runners 12 formed in the mold 11.

After the mandrel 10 holding the tube 2 has been properly set in the mold 11, a molten synthetic resin, such as a molten polyethylene resin is injected through a gate 13 and the runners 12 formed in the mold 11 into the molding cavities 3a and 4a by an insert injection molding machine. Thus, the bottom wall 3 and the hoop 4 are formed integrally with the tube 2 to form a body having an open upper end.

Then, the top cover 6 is placed on the body with the projections 7c formed on the flange 7 in contact with the end surfaces of the hoop 4, and the projections 7c are crushed by vibrations exerted thereon by an ultrasonic welder to weld the flange 7 to the hoop 4. Thus, the plastic container 1 having the top cover 6 provided with the spout 5 is formed. The top cover 6 is provided with the flange 7 and the spout 5 provided with the screw thread 8a to screw a cap 8 on the spout 5. As shown in FIGS. 3(a), (b) the projections 7c are formed on the lower surface of a peripheral part of the flange 7 at proper angular intervals. The projections 7c are crushed by vibrations exerted thereon by the ultrasonic welder and, finally, the projections 7c are merged into the hoop 4 and disappear.

The plastic container 1, similarly to conventional glass bottles and molded plastic containers, is used for containing a liquid, such as toilet water or soy source and is capable of stably standing alone and resistant to the formation of minute leaks therein.

When the plastic container 1 is used for containing a refill, the hoop 4 is formed in an outside diameter equal to the inside diameter of an open end part 20a of an outer container 20, the flange 7 is formed in an outside diameter slightly greater than that of the hoop 4 so that a peripheral part 7a of the flange 7 extends beyond the outer circumference of the hoop 4. The outer container 20 has a mouth part 20a provided with a screw thread 21 on its outer circumference. A holding cap 24 has a side wall provided with a screw thread 22 on its inner circumference and a top wall provided with an opening 23 through which the spout 5 of the plastic container 1 projects outside.

Figure 4:
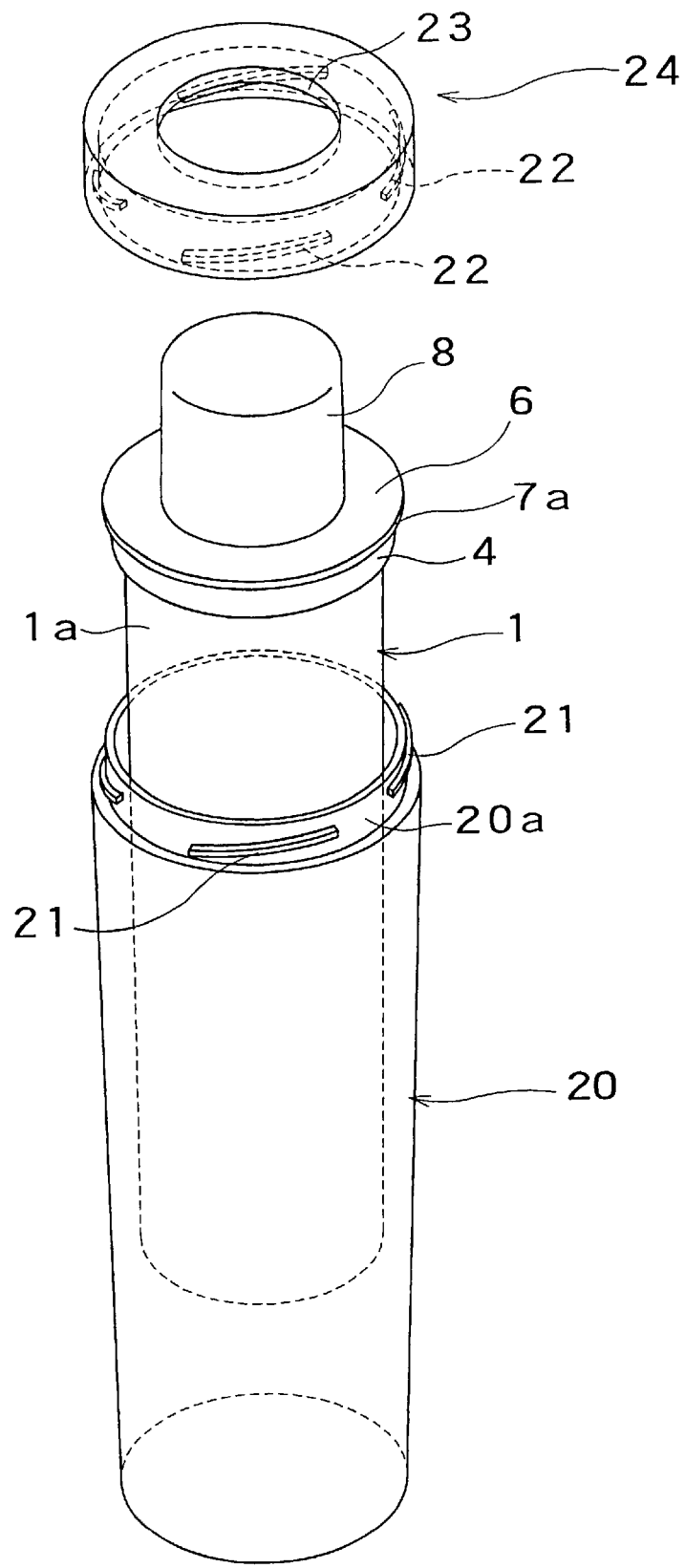
FIG. 4 is a perspective view of assistance in explaining the application of the plastic container shown in FIG. 1 to a container for containing a refill.
Figure 5:
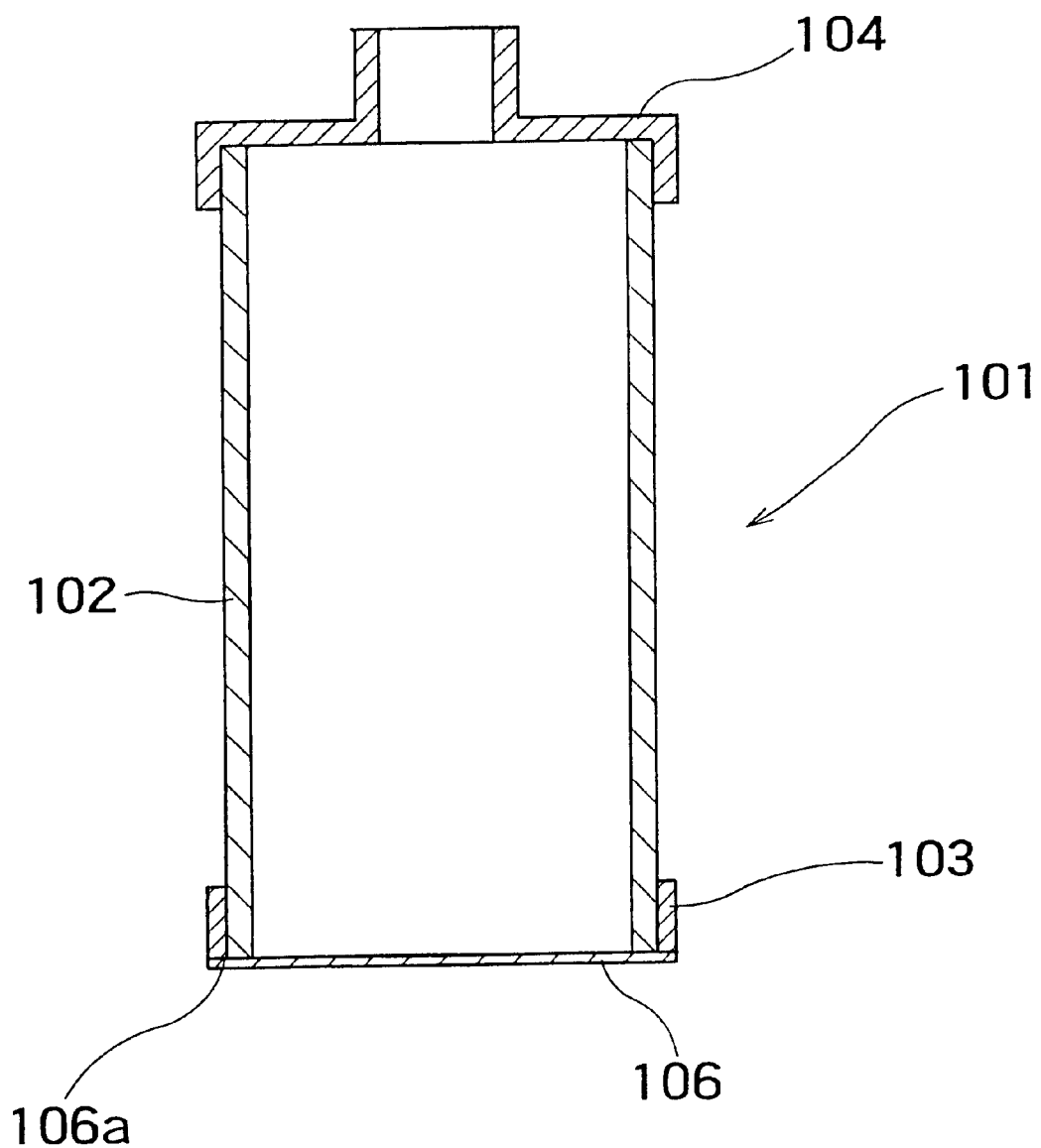
FIG. 5 is a sectional view of a prior art cartridge (plastic container)
Figure 6:
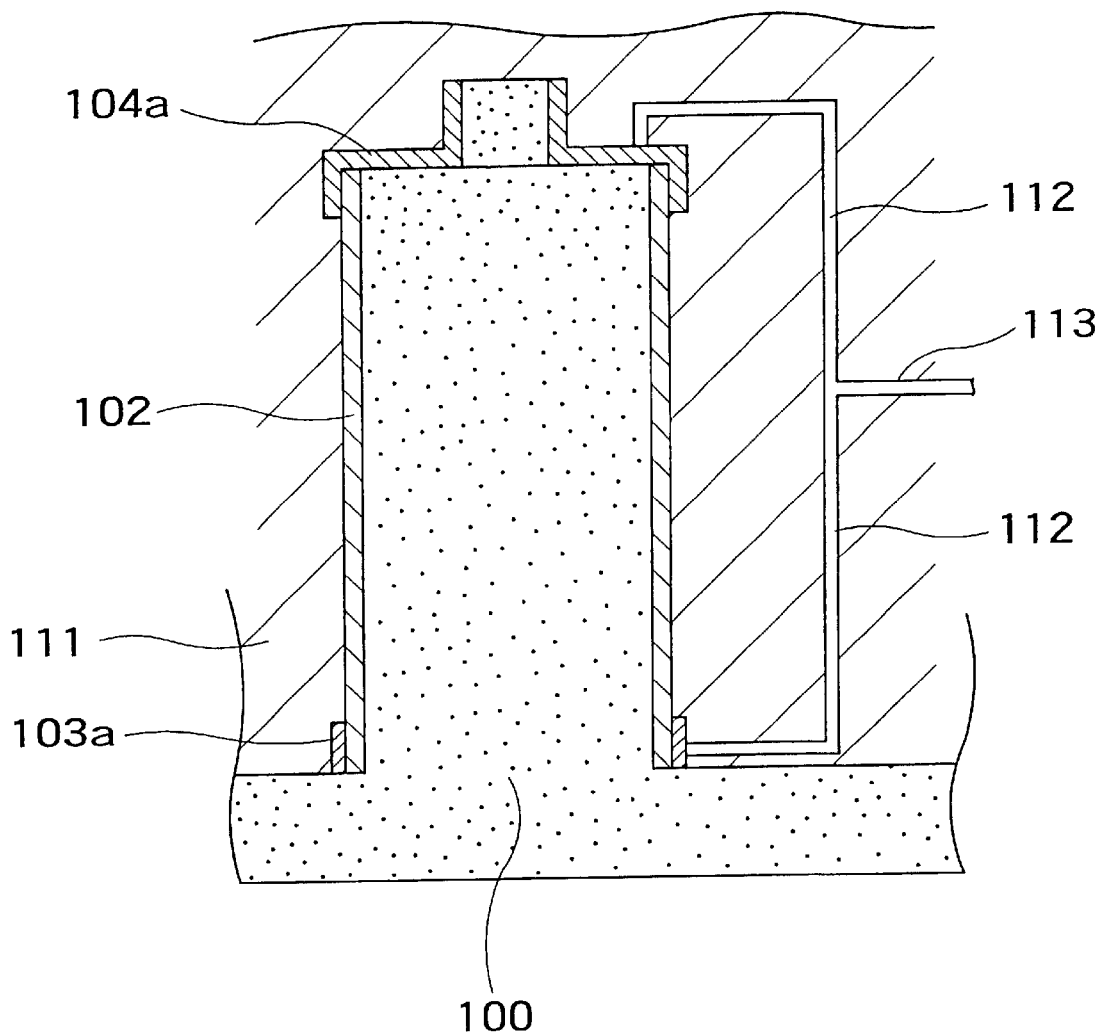
FIG. 6 is a sectional view of assistance in explaining a method of manufacturing the cartridge shown in FIG. 5.

The body 2 of the plastic container 1 is tapered from one end on the side of the spout 5 toward the other end on the side of the bottom wall 3. Therefore, the plastic container 1 can be easily inserted in the outer container 20. Preferably, the outer container 20 is formed of glass or a hard plastic material. In FIG. 4, the cap 8 is screwed on the spout 5 of the plastic container.

When assembling the plastic container 1 and the outer container 20, the plastic container 1 is inserted in the outer container 20 from its bottom upward so that the hoop 4 is fitted closely in the open end part 20a of the outer container 20 and the peripheral part 7a of the flange 7 is seated on the upper end surface of the open end part 20a of the outer container 20. Then, the holding cap 24 is screwed firmly on the open end part 20a of the outer container 20 with the screw thread 22 engaging the screw thread 21 and the spout 5 of the plastic container 1 projecting outside through the opening 23.

When the plastic container 1 is used for containing a refill, an empty plastic container 1 contained in the outer container 20 is replaced simply with a new plastic container 1 containing a refill. Therefore any troublesome work for opening a pouch or the like containing a refill and pouring the refill in an empty container is not necessary. Thus the plastic container can be easily put in the outer container 20 to refill the outer container 20, is excellent in sanitation and is particularly suitable for containing food or toiletries.

As apparent from the foregoing description, the plastic container according to the present invention, similarly to conventional glass bottles and molded plastic containers, is used for containing a liquid, such as toilet water or soy source and is capable of stably standing alone and resistant to the formation of minute leaks therein. When disposing of the plastic container, the body can be squashed out and the plastic container can be compacted in a small mass.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A plastic container comprising:
   a tube of a plastic laminate, the tube having opposite open ends so as to be mounted on a mandrel serving as a core;
   a bottom wall formed so as to be joined to only an inner circumference of a lower end part of the tube, the bottom wall being formed of a rigid plastic material other than the plastic laminate by an insert injection molding means;

a hoop formed on an outer circumference of an upper end part of the tube, the hoop being formed of the rigid plastic material by the insert injection molding means; and a top cover provided with a spout and bonded to an upper end surface of the hoop, a radius of the spout being smaller than a radius of the top cover, the top cover having a flat shape so as to make a surface of the top cover contact to the upper end surface of the hoop, wherein said mandrel can be taken away in a direction from the bottom wall to the hoop before the top cover is bonded to the upper end surface of the hoop, wherein the top cover is provided with projections in a part thereof corresponding to the hoop, and the projections are crushed by an ultrasonic means to bond the top cover to the hoop, and wherein a whole of an outer surface of the bottom wall being in a same plane with an edge of the lower end part of the tube.

2. The plastic container according to claim 1, wherein the plastic laminate is an opaque film including a metal foil.

3. The plastic container according to claim 1, wherein the plastic laminate is a transparent film.

4. A plastic container assembly comprising:

the plastic container of claim 1;

an outer container capable of containing the plastic container.

5. The plastic container assembly according to claim 4 wherein the tube of the plastic container is tapered from its upper end toward its lower end.

6. The plastic container assembly according to claim 4 or 5 further comprising a holding cap having a side wall provided with a screw thread on its inner circumference;

wherein the outer container has an open end part provided with a screw thread on its outer circumference, and the holding cap is screwed on the open end part of the outer container after inserting the plastic container in the outer container to fasten the plastic container to the outer container.

* * * * *